United States Patent [19]

Sun

[11] Patent Number: 4,783,445

[45] Date of Patent: Nov. 8, 1988

[54] SOLUBLE EPOXIDE/CARBON DIOXIDE COPOLYMERIZATION CATALYSTS

[75] Inventor: Hsiang-Ning Sun, Media, Pa.

[73] Assignee: Arco Chemical Company, Newtown Square, Pa.

[21] Appl. No.: 132,097

[22] Filed: Dec. 14, 1987

[51] Int. Cl.$^4$ .............................................. B01J 31/04
[52] U.S. Cl. ................................... 502/170; 528/405
[58] Field of Search ........................................ 502/170

[56] References Cited

U.S. PATENT DOCUMENTS

| | | | |
|---|---|---|---|
| 2,932,663 | 4/1960 | Kalenda | 502/170 X |
| 3,506,598 | 4/1970 | Groff et al. | 502/170 X |
| 4,268,684 | 5/1981 | Gurgiolo | 502/170 X |

Primary Examiner—Patrick P. Garvin
Attorney, Agent, or Firm—Lewis J. Young

[57] ABSTRACT

Catalysts which are soluble in a variety of solvents are prepared by reacting zinc compounds with anhydrides in the presence of an alcohol or by reacting zinc salts with a monoester of a dicarboxylic acid. These catalysts can be added as a solution to a mixture of epoxides and carbon dioxide to prepare polyalkylene carbonates.

7 Claims, No Drawings

SOLUBLE EPOXIDE/CARBON DIOXIDE COPOLYMERIZATION CATALYSTS

BACKGROUND OF THE INVENTION

The present invention is directed to improved catalysts for the copolymerization of epoxides with carbon dioxide.

Epoxides are known to copolymerize with carbon dioxide, with metal containing catalysts such as zinc diethyl and additives, zinc carboxylates, and metal porphyrin complexes.

The resulting copolymers have alternating epoxide and carbon dioxide groups, and are polycarbonates. These copolymers have found uses in many areas, such as ceramic binders, evaporative pattern casting, and adhesives. Epoxides shown to proceed readily in this reaction are ethylene oxide, propylene oxide, cyclohexene oxide, cyclopentene oxide, cis-2-butene oxide, and others.

The catalysts are generally solids which are not soluble in the polymerization solvents. Charging such catalysts to the polymerization reactor requires the handling of solids. Certain of the catalysts are also toxic and noxious to handle. It is therefore desirable to have soluble catalysts which can be charged to the reactor with other feedstocks without special equipment or handling requirements.

BRIEF SUMMARY OF THE INVENTION

It has now been found that catalysts which are soluble in most polymerization solvents can be prepared by the reaction of zinc compounds with either a dicarboxylic acid anhydride and an alcohol or with a monoester of a dicarboxylic acid. The catalysts so prepared are soluble in solvents and can be handled easily with the other feedstocks.

DETAILED DESCRIPTION OF THE INVENTION

The catalysts are prepared by reacting a zinc compound with a dicarboxylic acid moiety in a suitable solvent and subsequently removing the volatile materials under vacuum.

Zinc compounds suitable for the preparation of the catalysts are the oxide, lower carboxylates such as acetate and propionate, halides such as chloride, bromide and iodide, and others that are reactive with dicarboxylic acid moieties.

The dicarboxylic acid moieties useful for the catalyst preparation may be certain anhydrides, such as maleic anhydride and phthalic anhydride, or certain monoesters of dicarboxylic acids, such as monomethyl adipate and monoethyl fumarate.

Many solvents are suitable for the synthesis of the catalysts. When using anhydrides, the preferred solvents are the lower alcohols, such as methanol, ethanol, propanol, and butanol. When using the monoesters of dicarboxylic acids, the preferred solvents are the alcohols, ketones such as acetone, esters such as methyl acetate, and ethers such as tetrahydrofuran. The solvent should be low enough in molecular weight to be easily removed from the reaction mixture under vacuum.

The reaction temperature can be in the 0°–150° C. range, more preferably in the 20°–110° C. range, and most preferably in the 50°–90° C. range. Although air does not interfere with the reaction, its exclusion can reduce fire hazards. It is also advisable to exclude moisture from the reactor. Any convenient pressure can be used. Reaction time is in the 1–24 hour range, but the reaction is substantially completed in 4–16 hours. Adequate agitation will facilitate the reaction. The epoxides useful in the copolymerization reaction are the various alkylene oxides and cycloalkylene oxides. Examples of these are ethylene oxide, propylene oxide, cyclohexene oxide, cis-2-butene oxide, styrene oxide, epichlorohydrin, and many others. Mixtures of two or more epoxides can also be copolymerized with carbon dioxide by the instant process.

The carbon dioxide can be added to the polymerization reaction in a wide range of pressures. In order to have a useful rate of polymerization, the pressure is preferably at least 100 psig but lower pressures can be tolerated. The upper limit of carbon dioxide pressure is limited only by the equipment in which the polymerization is run.

The polymerization temperature is preferably between about 40° and 150° C., more preferably between 55° and 120° C. Too low a temperature wil render the rate of polymerization too slow. Too high a temperature may result in polymer decomposition.

Many polar and nonpolar solvents are suitable for the polymerization medium as long as they are purified and dried. Especially useful are hexane, toluene, tetrahydrofuran, methylene chloride, methyl acetate, and mixtures of these. It should be pointed out that although solvents may facilitate product removal from the reactor, the polymerization can be carried out without a solvent.

Polymerization time is generally dependent on the other reaction conditions, especially temperature and carbon dioxide pressure, to give good yields. Certain epoxides may also react slower. But, in general, one hour to 24 hours reaction time is adequate for most polymerizations. Under more favorable conditions, one to five hour reaction time is sufficient.

The following example is meant to illustrate but not limit the invention. All percentages and parts are by weight unless otherwise specified.

EXAMPLE I

To a 500 cc three-necked round bottom flask equipped with a thermometer, reflux condenser, and a nitrogen inlet valve was charged the following ingredients: 25 g of maleic anhydride, 15 g of zinc oxide, and 300 cc of anhydrous ethanol. The reaction mixture was magnetically stirred while heating to 65° C. After three hours, the heat was removed and the mixture was filtered. The filtrate was subjected to vacuum to remove the solvent and other volatiles. The residue comprised 26.2 g of clear, viscous catalyst.

To a 500 cc stainless steel autoclave reactor equipped with probes for temperature, pressure, and heat demand was added 6 g of the above catalyst, 30 g of cyclohexene oxide and 60 g of methylene chloride. The catalyst was completely soluble in the methylene chloride. The reactor was then charged with 700 psig of $CO_2$ and the mixture heated to 90° C. The temperature was maintained at 90° C. for 5 hours, and the polymer product recovered. The yield of polymer was 5.1 g per gram of zinc. From analyses by infrared and nuclear magnetic resonance spectroscopies, the product is substantially a 1:1 mole ratio copolymer of cyclohexene oxide and carbon dioxide.

EXAMPLE II

To a 1,000 cc three-necked round bottom flask equipped with a thermometer, reflux condenser, and a nitrogen valve tube was charged 30 g of zinc oxide, 75 g of phthalic anhydride, and 600 cc of anhydrous ethanol. The reaction mixture was magnetically stirred while being heated to 65° C. After 3 hours, the heat was removed and the mixture was filtered to give 14.4 g of solid. The filtrate was distilled in vacuo to remove the ethanol and other volatiles. The recovered solid catalyst from the filtrate weighed 100.3 grams. This catalyst was soluble in the polymerization solvents and the epoxides.

EXAMPLE III

To a 500 cc three-necked flask equipped with a thermometer, reflux condenser, and a nitrogen inlet valve was charged 5.0 g of zinc oxide, 20 g of monomethyl adipate, and 60 g of anhydrous ethanol. The reaction slurry was heated to 65° C. and magnetically stirred for 3 hours, when the reaction mixture was filtered. The solid was repeatedly washed with cold ethanol. The filtrates were combined and the volatiles removed in vacuo to give 20.9 g of catalyst product.

To a 500 cc stainless steel autoclave reactor equipped with probes for temperature, pressure, and heat demand was added 6 g of the above catalyst, 6.35 g of propylene oxide, 23.65 g of cyclohexene oxide and 60 g of methylene chloride. The catalyst mixture was completely soluble in the methylene chloride. The reactor was then charged with 700 psig of $CO_2$ and the mixture heated to 90° C. The temperature was maintained at 90° C. for 5 hours, and the polymer product recovered. The yield of polymer was 12.4 g per gram of zinc. From analyses by infrared and nuclear magnetic resonance spectroscopies, the product is substantially a terpolymer of propylene oxide, cyclohexene oxide and carbon dioxide. The mole ratio between the total epoxide and $CO_2$ was about 1:1.

EXAMPLE IV

To a 500 cc three necked round bottom flask equipped with a thermometer, reflux condenser, and a nitrogen inlet valve, was charged 5.4 g of zinc oxide, 19.2 g of monoethyl fumarate, and 60 g of acetone. The reaction mixture was brought to reflux and magnetically stirred for 16 hours. The mixture was then filtered and washed with acetone. The filtrates were combined and the volatiles were removed by distillation in vacuo. The yield of viscous liquid catalyst was 22.3 grams.

We claim:

1. A process for preparing soluble zinc catalysts for the copolymerization of epoxides and carbon dioxide to form polycarbonates comprising reacting, at a temperature of from 0° to 150° C. for a time of 1 to 24 hours, a mixture of a zinc compound selected from the group consisting of zinc oxide and zinc salts and a dicarboxylic acid, anhydride thereof or monoester thereof in a suitable solvent and subsequently removing the volatile components by distillation under vacuum.

2. The process of claim 1 wherein said zinc compound is zinc oxide.

3. The process of claim 1 wherein said zinc compound is zinc acetate.

4. The process of claim 1 wherein said anhydride is maleic anhydride.

5. The process of claim 1 wherein said anhydride is phthalic anhydride.

6. The process of claim 1 wherein said monoester is monomethyl adipate.

7. The process of claim 1 wherein said monoester is monoethyl fumarate.

* * * * *